United States Patent

[11] 3,540,338

[72] Inventors James McEwan
 Saratoga and
 Basil R. Bushman, San Jose, California
[21] Appl. No. 777,651
[22] Filed Nov. 21, 1968
[45] Patented Nov. 17, 1970
[73] Assignee James McEwan, Inc.
 San Jose, California
 a corporation of California

[54] CUTOFF MACHINE
 6 Claims, 4 Drawing Figs.
[52] U.S. Cl. .................................................... 83/490,
 83/491; 143/46
[51] Int. Cl. ...................................................... B26d 1/18,
 B27b 5/18
[50] Field of Search ......................................... 83/490,
 491, 646, 647, 647.5; 51/47; 143/46

[56] References Cited
UNITED STATES PATENTS
479,399 7/1892 Colborne ...................... 83/647X
2,801,458 8/1957 Remmen ....................... 83/490X Primary Examiner—William S. Lawson
Assistant Examiner—Leon Gilden
Attorney—Allen & Chromy ABSTRACT: A cutoff machine in which the linkage means oscillating the cutoff saw blade backward and forward through the stock being cut is isolated from the means supplying pressure to the cutoff blade. In this machine the cutoff blade arbor and the motor for driving the blade are both mounted on a rocking head which is mounted by a pivoting linkage on the frame. Certain members of this linkage are connected to an air cylinder which is adapted to tilt the rocking head about the fixed pivoting axis of the linkage whereby pressure is applied urging the saw blade into the stock or work. An oscillator disc driven by a motor at slow speed is connected to a member of the linkage for oscillating the rocking head with respect to said fixed pivoting axis whereby the saw blade is oscillating back and forth with reference to the work and the saw blade is prevented from plunging into the work either in its forward or reverse stroke, thus allowing even pressure to be applied urging the saw blade into the work.

Patented Nov. 17, 1970

INVENTOR.
JAMES McEWAN
BASIL R. BUSHMAN
BY
ATTORNEYS

CUTOFF MACHINE

DESCRIPTION OF THE INVENTION

This invention relates to a cutoff machine in which the cutoff saw blade is oscillated back and forth with reference to the work while even pressure is applied thereto urging it into the work.

An object of this invention is to provide an improved cutoff machine in which the cutoff blade is prevented from plunging into the work.

Another object of this invention is to provide an improved cutoff machine in which the rocking head, which supports the cutoff blade arbor and the cutoff blade driving motor, is oscillated back and forth with respect to the work at the same time as an even pressure is applied urging the saw blade into the work.

Still another object of this invention is to provide an improved supporting linkage for the cutoff saw blade, said linkage being provided with links urging the saw blade into the work and additional links causing the saw blade to oscillate back and forth in the work, the various lengths of said linkage being supported on the frame of the machine by a common fixed pivoting shaft.

Other and further objects of this invention will be apparent to those skilled in the art to which it relates from the following specification, claims and drawing.

In accordance with this invention there is provided an improved cutoff machine that employs an abrasive or other type saw blade mounted on an arbor which is attached to a rocking head supported on the frame of the machine by an improved linkage. Different members of this linkage are connected to two sources of power, one of these sources being employed for urging the saw blade into the work by applying even pressure thereto and the other of these sources being employed to provide oscillatory motion to the rocking head for moving the saw blade back and forth with respect to the work during the cutoff operation.

Further details of this invention will be set forth in the specification, claims, and drawing in which, briefly:

Figure 1:
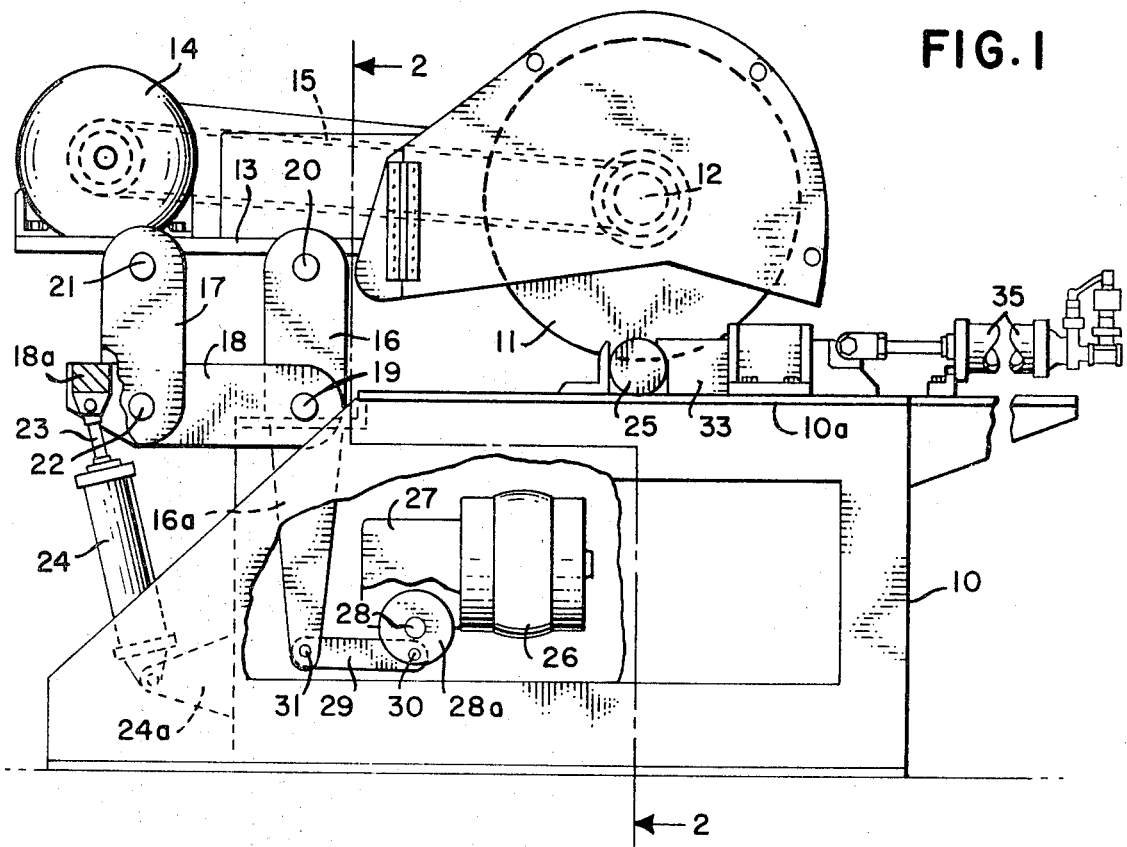
FIG. 1 is a side view partially broken away showing an embodiment of this cutoff machine.

Referring to the drawing in detail, reference numeral 10 designates the frame structure for this cutoff machine. The circular saw blade 11 of the cutoff machine is attached to the pulley 12 which is supported on a plate forming the rocking head 13. An electric motor 14 which is provided with a suitable pulley for receiving the belt 15 is employed for driving the saw blade 11 and for this purpose the arbor 12 is also provided with a suitable pulley which is driven by the belt 15.

Figure 2:
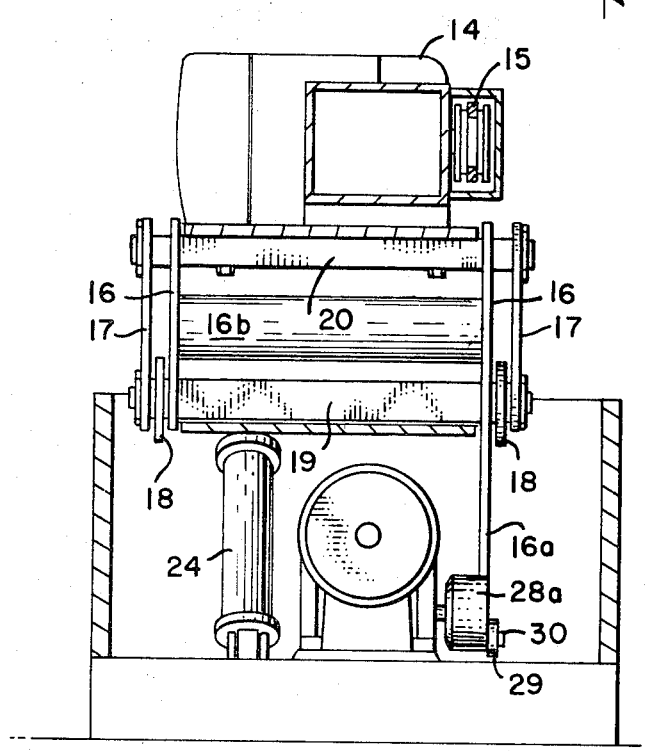
FIG. 2 is a sectional view taken along the line 2–2 of FIG. 1.

A linkage employing two sets of members 16, 17, and 18 is provided between the rocking head 13 and the frame 10, one of these sets of members being positioned on one side of the rocking head 13 and the other set being positioned on the other side. The upper ends of the members 16 and 17 are provided with suitable bearings for receiving the opposite ends of shafts 20 and 21, respectively, which are fixedly attached to the bottom of the rocking head 13 by suitable bolts or the like. Suitable bearings are also provided to the left-hand end portions of the members 18 for receiving the end portions of shaft 22. The bottom part of the left-hand member 16 shown in FIG. 2 and the midportion of right-hand member 16 shown in FIG. 2 are provided with bearings for receiving the fixed shaft 19. A suitable bracing member 16b may be provided between the members 16. The right-hand member 16 is provided with a downwardly extending member 16a which is integral therewith and which is positioned on the back side of the machine shown in FIG. 1. The shaft 19 is fixedly attached to the frame 10 and forms the fixed axis about which the linkage employing members or links 16, 17 and 18 are tilted or moved during the operation of this machine. Members 16 form the main supports for the rocking head 13 while members 17 and 18 form the linkage for transmitting pressure from the cylinder 24 to the rocking head for urging the saw blade into the stock 25. Links 18 serve to isolate pressure applied to the rocking head from the oscillatory motion applied thereto as will be described hereinafter.

Figure 3:
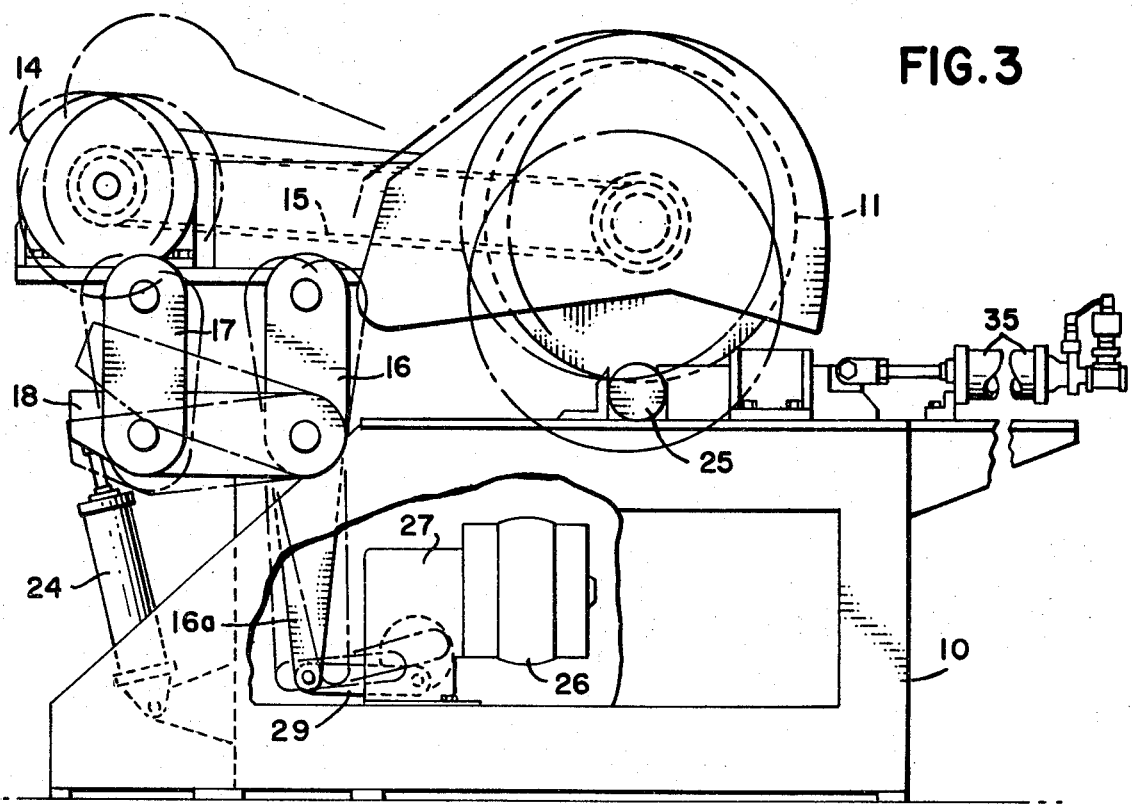
FIG. 3 is a side view similar to FIG. 1 showing the limits of motion of the cutoff saw blade, rocking head and the linkage which supports the rocking head on the machine frame.
Figure 4:
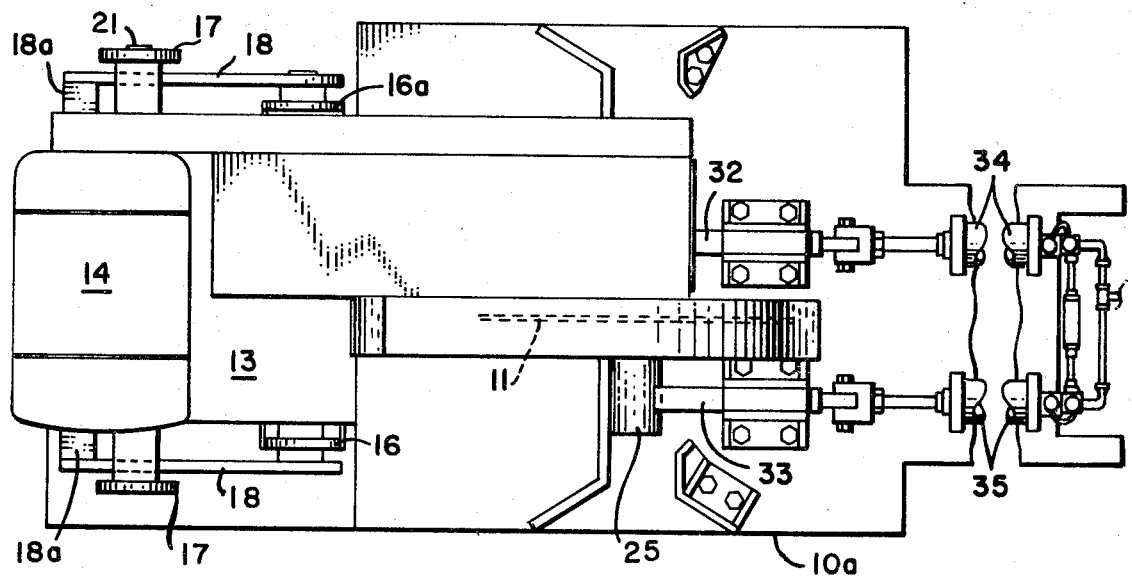
FIG. 4 is a top view of this machine.

The adjacent end portions of members 17 and 18 are provided with suitable bearings for receiving the shaft 22 which is floating thereon and a crosspiece 18a is connected between the outer ends of the members 18. The piston rod 23 of the air cylinder 24 is pivotally connected to the crosspiece 18a so that links 17 and the outer ends of members 18 may be moved up and down with respect to the fixed axis of the shaft 19 when the air cylinder 24 is operated by providing suitable pressure thereto from a source of air pressure (not shown), which is of conventional construction. Supplying suitable air pressure to the lower part of the cylinder 24, moves the piston rod 23 upward and links 17 tilt the rocking head 13 with respect to the axis of shaft 20 and the saw blade 11 is pressed into the stock 25. At the same time links 18 are tilted upward around the axis of the shaft 19 to the upper position shown in broken line in FIG. 3, and the saw blade 11 is pressed into the stock 25 as shown in the broken line.

The rocking head 13 and saw blade carried thereby are moved back and forth through the operation of the motor 26. Motor 26 is provided with a reduction gearing 27 of conventional construction which is connected to the output shaft 28. Reduction gearing 27 is provided with a crank disc 28a which is fixedly mounted on shaft 28 and which drives the oscillating link 29. One end of the link 29 is rotatably connected to the disc 28a by the pin 30 and the other end thereof is connected to the bottom part of the arm 16a by the pin 31. Thus, as the crank disc 28a is slowly rotated by the reduction gearing the connecting link 29 moves the bottom of the arm 16a to and fro with respect to the fixed axis of the shaft 19, and the upper parts of the members 16 and the rocking head 13 are also moved slowly to and fro. As a result the saw blade 11 is moved back and forth across the stock 25 as the saw blade is rotated by the motor 14. The stock 25 is held on the table 10a of the machine by the clamping members 32 and 33 which are pressed against the stock 25 by air or hydraulic pressure supplied to the cylinders 34 and 35, respectively, which are of conventional construction.

While we have shown a preferred embodiment of the invention, it will be apparent to those skilled in the art that the invention is capable of variation and modification from the form shown so that the scope thereof should be limited only by the proper scope of the claims appended hereto.

We claim:

1. In a cutoff saw for sawing metal and similar hard or tough material the combination of a frame, means on said frame for holding stock to be cut, a rocking head, pivoted means supporting said rocking head on said frame, a saw blade, means rotatably supporting said saw blade on said rocking head, means driving said saw blade, means attached to said frame and to said rocking head pressing said saw blade into said stock, said means pressing said saw blade into said stock including a linkage pivotally connected to said rocking head and to said frame, said linkage having an intermediate part connected to a fluid pressure device applying pressure through said linkage to said rocking head, and means slowly moving said rocking head and said saw blade on said pivoted supporting means back and forth across said stock as said saw blade is pressed into said stock.

2. In a cutoff saw for sawing metal and similar hard or tough material the combination as set forth in claim 1, further characterised in that said pivoted supporting means comprises members pivotally attached to said rocking head and pivotally attached to said frame at the same point as said linkage, and said means moving said rocking head comprises means attached to at least one of said members imparting oscillatory motion thereto with respect to the pivot on said frame.

3. In a cutoff saw for sawing metal and similar hard or tough material the combination comprising a frame, means on said frame for holding stock to be cut, a rocking head, a linkage having a plurality of links pivotally connected to said rocking head, means connecting said linkage to a pivoting member, said pivoting member being attached to said frame for supporting said rocking head on said frame, a saw blade rotatably supported by said rocking head, means driving said saw blade, means connected to said linkage pressing said saw blade into said stock, and means connected to said linkage oscillating said rocking head so that said saw blade is moved back and forth with respect to said stock independently of said pressing means to facilitate smooth cutting progress of said saw blade through said stock.

4. In a cutoff saw for sawing metal and similar hard or tough material the combination as set forth in claim 3, further characterised in that said means oscillating said rocking head comprises an arm attached to said linkage, and means connecting said arm to a motor oscillating said arm and said rocking head.

5. In a cutoff saw for sawing metal and similar hard or tough material the combination as set forth in claim 4, further characterised in that said arm is rotatably supported on said pivoting member and said oscillating motion takes place around this pivoting member.

6. In a cutoff saw for sawing metal and similar hard or tough material the combination as set forth in claim 5, further characterised in that said means connecting said arm to said motor includes a rotatable member forming a crank which oscillates said arm as it is rotated by said motor.